Sept. 2, 1941.
A. P. HAUEL
2,254,286
ELECTRODE
Filed Sept. 23, 1939
Fig. 2
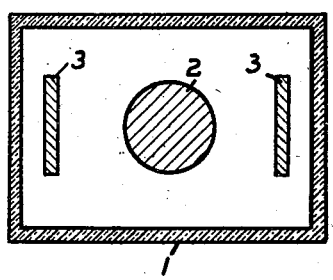
Fig. 4
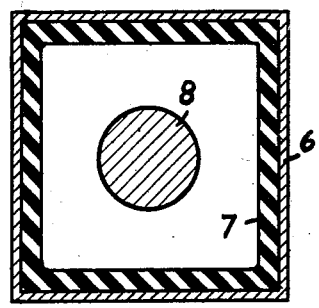
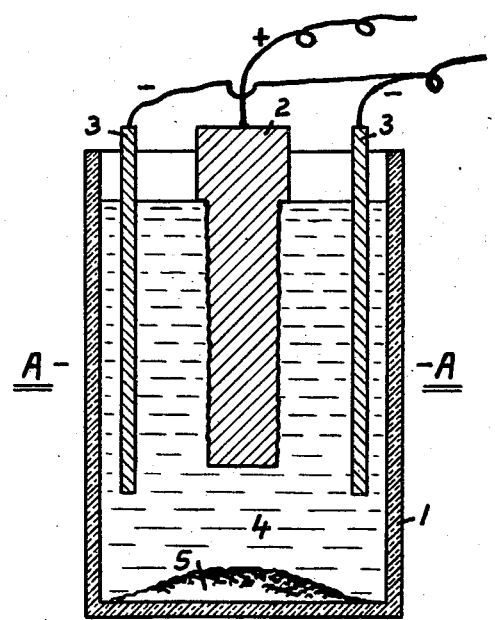
Fig. 1
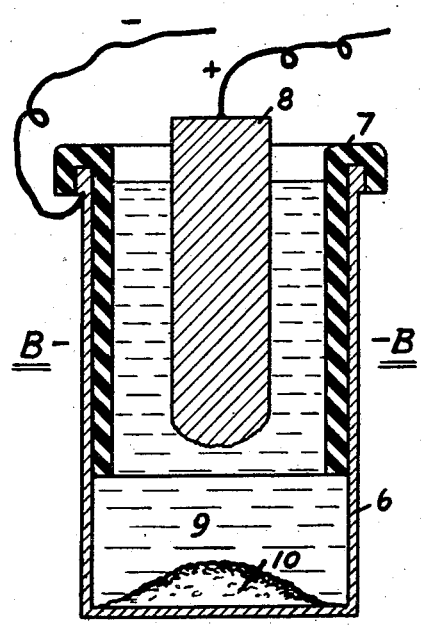
Fig. 3
INVENTOR.
Anna P Hauel
BY C. A. Orr.
AGENT.

Patented Sept. 2, 1941

2,254,286

UNITED STATES PATENT OFFICE 2,254,286

ELECTRODE

Anna P. Hauel, New York, N. Y.

Application September 23, 1939, Serial No. 296,221

9 Claims. (Cl. 136—24)

My present invention relates to a process of preparing an active mass for the electrodes of cadmium-nickel storage batteries and to the negative electrodes produced by my new process.

It is the main object of my invention to improve the active mass used for said negative electrodes.

A further object of my invention is to produce an active mass containing cadmium compounds, being more active than the cadmium compounds now in use.

It is therefore a further object of my invention to form cadmium hydroxide and cadmium oxide as active material by a process which gives the formed cadmium particles especially great active surface.

In order to achieve the above objects I propose to produce as active mass for the electrodes cadmium hydroxide and cadmium oxide in such a way that each particle of these oxides is covered immediately after formation of the oxides themselves by protective layers of other heavy metal compounds. These heavy metal layers, covering and coating the cadmium particles, avoid recrystallization, sticking and adhering to other particles and thereby insure a finely divided state of the cadmium particles themselves.

In accordance therewith it is the main feature of my invention to prepare active mass for the electrodes by forming cadmium hydroxide and cadmium oxide in presence of at least one other heavy metal compound causing thereby the adsorption of finely divided heavy metal compounds on the surface of the cadmium hydroxide and oxide particles formed.

Preferably the heavy metal in presence of which the active mass is formed are selected from the group consisting of iron, cobalt, nickel, zinc, manganese, chromium, copper, silver, mercury, lead and bismuth; the amount of used heavy metal must be chosen in such a way that the proportion of heavy metal to the cadmium hydroxide and oxide formed ranges in the cadmium- compound-heavy metal mixture from 0.001 to 30 parts heavy metal to 100 parts cadmium. I want to point out that I may use instead of heavy metals also compounds of these metals; from the point of view of the present invention compounds of heavy metals are for the electrolyzing process as well adapted as the heavy metals themselves.

In carrying out my new process I propose further to produce and form the cadmium compounds in presence of finely divided heavy metals in order to facilitate the adsorption of heavy metal by the cadmium hydroxides and oxides.

I have further found that I receive very clean and finely divided cadmium hydroxide and oxide by forming these compounds by anodic oxidation; although I may use this cadmium compound without any further admixture it is of advantage to add during the electrolyzing at least one heavy metal. This may be carried out in different ways:

The heavy metal may be present in finely divided state in the electrolyte during the electrolyzing or I may use an anode consisting of a cadmium alloy containing besides cadmium at least one other heavy metal compound, causing thereby besides the oxidation of said cadmium also the oxidation of said heavy metal, whereby the thus produced heavy metal hydroxides and oxides are adsorbed on the cadmium hydroxide and oxides particle surfaces. It is also possible to use two anodes, one containing the cadmium and the other containing at least one heavy metal, and to form by anodic oxidation of the both anodes the needed cadmium and heavy metal hydroxides and oxides in finely divided state.

I will now proceed to describe my invention with reference to the accompanying drawing in which—

Figures 1 and 2 show an electrolyzing apparatus with separate iron cathodes in horizontal and vertical cross section,.

Figures 3 and 4 an electrolyzing apparatus with an iron container as cathode in horizontal and vertical cross section, both adapted to carry out my new process.

The electrolyzing apparatus shown in Figs. 1 and 2 consists of a container 1 preferably of glass or other nonconductive material containing the electrolyte 4. The electrolyte is produced as described above. The cadmium anode 2 has the shape of a rod and is arranged vertically suspended in the electrolyte; the iron cathodes 3 are also suspended preferably vertically, as shown. In carrying out the process according to my invention the anode corrodes, as shown, on its outer surface immersing in the electrolyte, and the cadmium hydroxide and oxide 5 formed is caused to sink down and to drop to the bottom of the container 1 in which the electrolysis is carried out. Thus the cadmium compound 5 formed may be easily collected and subjected to further treatment before being filled into the electrode pockets of the batteries.

The electrolyzing apparatus shown in Figs. 3 and 4 consists of an iron container 6 in which the electrolyzing process is carried out. This container contains the electrolyte 9 in which the cadmium anode 8 immerses. This container 6 has insulated, preferably hard rubber plated, walls 7 and only the container bottom is exposed to the electrolyte 9. This container bottom is used as cathode in the electrolyzing process. On the anode 8 especially on its lower end cadmium hydroxide is formed which sinks as a precipitate 10 through the electrolyte and drops on the bottom of the container 6. Thereby hydrogen is formed on the cathode which, rising in the electrolyte, is mixing it continuously. A part of the cadmium hydroxide 10 covering the cathode is thereby reduced to metallic cadmium powder. This metallic cadmium—cadmium hydroxide mixture is thereafter separated from the electrolyte 9.

By producing the cadmium oxide by anodic oxidation it is of course not important how many cadmium anodes are subjected to anodic oxidation and whether the oxidation is carried out by means of continuous or interrupted or reversed current. It may be sometimes advantageous to change during the electrolysis the current direction, particularly when all the electrodes immersed into the electrolyte consist of cadmium.

In case an electrolyte containing the heavy metal compounds is used, this electrolyte may be produced either by making an aqueous solution of a salt of an alkali metal containing said heavy metal or by making an aqueous solution of a caustic alkali in which oxides or hydroxides of at least one other heavy metal are suspended and floating; as electrolyte may be used also a solution being produced by mixing a caustic alkali with the salt of an alkali metal in order to increase the conductivity of the electrolyte. It is hereby of advantage to produce a heavy metal oxide or hydroxide suspension before adding it to the electrolyte by precipitation in presence of a colloid, said colloid acting as so called "protective colloid" in order to obtain a suspensoid showing a very slow sedimentation, and to add said suspensoid to the electrolyte in which the cadmium compounds are to be formed.

In order to facilitate the formation of the active material I propose to give the anodes the shape of plates or rods 2 as shown in Fig. 1 and to arrange these anodes vertically in the electrolyte thereby causing the cadmium hydroxide and oxide formed to sink down and to drop to the bottom of the container or vessel in which the electrolysis is carried out; thus the cadmium compound formed may be easily collected and subjected to further treatment before being filled in the electrode pockets of the batteries.

In order to save current during the forming process I propose to reduce after the formation of the finely divided cadmium compounds coated by heavy metals at least a part of the finely divided cadmium compounds to finely divided cadmium and to use said metallic cadmium powder without or with admixture of cadmium oxide or cadmium hydroxide as active mass for the negative electrodes. As shown in Fig. 3 this modification may be easily carried out by providing substantially vertically arranged anodes and a substantially plate shaped cathode being arranged under said vertical anodes thereby causing the formed cadmium oxide and hydroxide particles to sink in said electrolyte and to drop on said cathode, on which the cadmium compounds are reduced to a very finely divided sponge like metallic cadmium powder.

In order to increase the electric conductivity I further propose to add to the cadmium compound formed before filling in the electrode pockets of about 1 to 30 per cent of a material adapted to increase this conductivity e. g. flaky graphite, finely divided metallic iron or the like.

The negative electrodes produced by my new process contain as active mass a substance selected from the group consisting of cadmium oxide and cadmium hydroxide formed in presence of at least one other heavy metal compound in finely divided state. As stated above I prefer to select as active mass cadmium oxide or cadmium hydroxide formed by anodic oxidation.

The following examples illustrate my invention, but they are not intended to limit it thereto:

1. In an electrolyzing apparatus cadmium hydroxide and oxide is formed by oxidation of the anodes containing metallic cadmium. As shown in Figs. 1 and 2 an anode preferably a cadmium bar of about 5 centimeters diameter is used. This cadmium bar is preferably vertically suspended and immerses in the electrolyte. As cathodes two iron sheet plates may be used. The anode and the cathodes immerse about 20 centimeters in the electrolyte.

The electrolyte is produced by dissolving caustic potash (KOH) in water until a specific weight of the solution of about 1.18 is reached. About 2.5 liters of said electrolyte are used at once in the electrolyzing vessel. Separately about 5 grams manganese sulphate, 5 grams cobalt sulphate, 20 grams ferrous sulphate, 20 grams bismuth sulphate are dissolved in 1000 cubic centimeters of water. During the electrolysis every two hours about 0.5 cubic centimeter of this solution are added to the electrolyte. The particles of these heavy metal compounds are adsorbed on the surface of the cadmium oxide and hydroxide particles in such a way that each particle of these oxides is covered immediately after formation of the oxides themselves by protective layers of these heavy metals.

By the electrolysis the anode oxidizes and corrodes, forming thereby cadmium hydroxide $Cd(OH)_2$ as a precipitate. This cadmium hydroxide sinks in the electrolyte and falls to the bottom of the vessel in which the electrolysis is carried out, and may be thereafter separated from the electrolyte, washed and dried.

2. Also in this case the cadmium hydroxide to be used for the battery electrodes is produced by anodic oxidation and corrosion in an electrolyte containing also another heavy metal compound in suspension or in solution. As shown in Figs. 3 and 4 I propose to use as anode a cadmium bar of 5 centimeters diameter vertically suspended and immersing in the electrolyte. The vessel containing the electrolyte has insulated preferably hard rubber lined walls, and only the bottom of the vessel is exposed to the electrolyte and consists of a conducting material preferably of iron. This bottom of the vessel is used as cathode in the electrolyzing process.

As electrolyte a solution of 400 grams sodium chloride in 2 liters of water is used to which solution 1 gram copper sulphate, 0.5 gram bismuth sulphate and 0.5 gram mercuric chloride may be added.

During the electrolysis the electrolyte is heated through the bottom of the vessel to a temperature of about 80° C. On the anode cadmium hydroxide is formed, which sinks as a precipitate through the electrolyte and drops on the cathode bottom. Thereby hydrogen is formed on the cathode which rises in the electrolyte, mixing it continuously up. A part of the cadmium hydroxide covering the cathode is thereby reduced to metallic cadmium powder.

Although this disclosure of the above is that of the preferred embodiments, it will be readily understood that the invention is susceptible to considerable modification and change and comprehends other details and procedures without departing from the spirit of the invention defined in the following claims:

What I claim as my invention is:

1. In a process of preparing an active mass for the electrodes of cadmium-nickel storage batteries the step of forming a substance of the group consisting of cadmium hydroxide and cadmium oxide by anodic oxidation of metallic cadmium in the presence of at least one other heavy metal in finely divided state in an electrolyte consisting of an aqueous solution of at least one substance selected from the group consisting of alkali salts and alkali hydrates.

2. In a process of preparing an active mass for the electrodes of cadmium-nickel storage batteries the step of forming a substance of the group consisting of cadmium hydroxide and cadmium oxide by anodic oxidation of an anode containing metallic cadmium in an electrolyte, said electrolyte consisting of an aqueous solution of a caustic alkali in which oxides or hydroxides of at least one other heavy metal are suspended and floating.

3. In a process of preparing an active mass for the electrodes of cadmium-nickel storage batteries the step of forming a substance of the group consisting of cadmium hydroxide and cadmium oxide by anodic oxidation of an anode containing metallic cadmium in an electrolyte consisting of an aqueous solution of at least one substance selected from the group consisting of alkali salts and alkali hydrates and an oxide or hydroxide of at least one other finely divided heavy metal in suspension, said heavy metal oxide or hydroxide suspension being produced before adding to said electrolyte by precipitation in presence of a colloid, said colloid acting as so called "protective colloid" in order to obtain a suspensoid showing a very slow sedimentation.

4. In a process of preparing an active mass for the electrodes of cadmium-nickel storage batteries the steps which consist in forming a substance of the group consisting of cadmium hydroxide and cadmium oxide by anodic oxidation of an anode containing metallic cadmium in an electrolyte consisting of an aqueous solution of at least one substance selected from the group consisting of alkali salts and alkali hydrates, in presence of at least one other heavy metal in finely divided state in said electrolyte, causing thereby the formation of protective layers of said heavy metal on the cadmium oxide or hydroxide particles formed, and reducing thereafter at least a part of the finely divided cadmium hydroxide or cadmium oxide formed to finely divided metallic cadmium.

5. In a process of preparing an active mass for the electrodes of cadmium-nickel storage batteries the steps which consist in forming a substance of the group consisting of cadmium hydroxide and cadmium oxide by anodic oxidation of substantially vertically arranged anodes containing metallic cadmium in an electrolyte consisting of an aqueous solution of at least one substance selected from the group consisting of alkali salts and alkali hydrates and at least one other finely divided heavy metal in suspension, causing thereby the formation of protective layers of said heavy metal on the cadmium oxide or hydroxide particles formed, said cadmium oxide or hydroxide particles sinking in said electrolyte and dropping on a cathode being arranged under said vertical anodes, causing thereby the cadmium hydroxide or oxide during their contact with said cathode to be reduced to a very finely divided metallic cadmium sponge-like powder.

6. Negative electrodes for cadium-nickel storage batteries containing as active mass a substance selected from the group consisting of cadmium oxide and cadmium hydroxide formed by anodic oxidation of an anode containing metallic cadmium in an electrolyte consisting of an aqueous solution of at least one substance selected from the group consisting of alkali salts and alkali hydrates, in presence of at least one other heavy metal in finely divided state in said electrolyte.

7. In a process of preparing an active mass for the electrodes of cadmium nickel storage batteries the step of forming a substance of the group consisting of cadmium hydroxide and cadmium oxide by anodic oxidation of metallic cadmium in an electrolyte consisting of an aqueous solution of at least one substance selected from the group consisting of alkali salts and alkali hydrates in the presence of at least one other heavy metal in finely divided state in said electrolyte.

8. In a process of preparing an active mass for the electrodes of cadmium nickel storage batteries the step of forming a substance of the group consisting of cadmium hydroxide and cadmium oxide by anodic oxidation of metallic cadmium in an electrolyte consisting of an aqueous solution of at least one substance selected from the group consisting of alkali salts and alkali hydrates in the presence of at least one other heavy metal of the group consisting of iron, cobalt, nickel, zinc, manganese, chromium, copper, silver, mercury, lead, and bismuth in finely divided state in said electrolyte.

9. Process of preparing an active mass for the electrodes of cadmium-nickel storage batteries, comprising the steps of forming a substance of the group consisting of cadmium hydroxide and cadmium oxide by anodic oxidation of an anode containing metallic cadmium in an electrolyte consisting of an aqueous solution of at least one substance selected from the group consisting of alkali salts and alkali hydrates in presence of at least one other heavy metal in said electrolyte, and adding to said substance of 1 to 30 per cent of flaky graphite.

ANNA P. HAUEL.